United States Patent
D'Amico et al.

(10) Patent No.: US 9,261,959 B1
(45) Date of Patent: Feb. 16, 2016

(54) INPUT DETECTION (71) Applicant: Google Inc., Mountain View, CA (US)

(72) Inventors: Sam D'Amico, Mountain View, CA (US); Xiaoyu Miao, Mountain View, CA (US)

(73) Assignee: Google Inc., Mountain View, CA (US)

( * ) Notice: Subject to any disclaimer, the term of this patent is extended or adjusted under 35 U.S.C. 154(b) by 132 days.

(21) Appl. No.: 13/852,666

(22) Filed: Mar. 28, 2013

(51) Int. Cl.
G09G 5/00 (2006.01)
G06F 3/01 (2006.01)
G02B 27/00 (2006.01)

(52) U.S. Cl.
CPC ............ G06F 3/013 (2013.01); G02B 27/0093 (2013.01)

(58) Field of Classification Search
CPC . G06F 3/013; G02B 27/0093; G02B 27/0018
USPC ............ 345/7–8, 633; 349/11; 359/13, 205.1, 359/212.1, 629–633
See application file for complete search history.

(56) References Cited

U.S. PATENT DOCUMENTS

| | | | |
|---|---|---|---|
| 5,345,281 A | 9/1994 | Taboada et al. | |
| 5,430,505 A | 7/1995 | Katz | |
| 5,481,622 A | 1/1996 | Gerhardt et al. | |
| 5,491,757 A | 2/1996 | Lehmer et al. | |
| 6,634,749 B1 | 10/2003 | Morrison et al. | |
| 6,758,563 B2 | 7/2004 | Levola | |
| 6,927,694 B1 | 8/2005 | Smith et al. | |
| 7,401,920 B1 | 7/2008 | Kranz et al. | |
| 7,438,414 B2 | 10/2008 | Rosenberg | |
| 7,798,643 B2 | 9/2010 | Waldorf et al. | |
| 7,809,160 B2 | 10/2010 | Vertegaal et al. | |
| 7,963,652 B2 | 6/2011 | Vertegaal et al. | |
| 2009/0115966 A1 | 5/2009 | Waldorf et al. | |
| 2010/0097580 A1* | 4/2010 | Yamamoto et al. | 353/69 |
| 2010/0208207 A1 | 8/2010 | Connell, II | |
| 2010/0220291 A1* | 9/2010 | Horning et al. | 351/210 |
| 2012/0044573 A1* | 2/2012 | Simmonds et al. | 359/631 |

FOREIGN PATENT DOCUMENTS

| | | |
|---|---|---|
| WO | 2006/100645 A2 | 9/2006 |
| WO | 2012/008966 A1 | 1/2012 |

OTHER PUBLICATIONS

Babcock, et al., "Building a Lightweight Eyetracking Headgear", 2004, p. 109.

* cited by examiner

*Primary Examiner* — Jennifer Nguyen
(74) *Attorney, Agent, or Firm* — McDonnell Boehnen Hulbert & Berghoff LLP (57) ABSTRACT

Exemplary methods and systems provide for eye-tracking. An exemplary method may involve: causing a projection of a beam of light onto an eye and receiving data regarding a reflection of light from the beam of light off of the eye. The method further includes correlating a pupil of the eye with a darkest region from the data. The darkest region comprises a region that is darker relative to other regions of the reflection data. Once the pupil has been correlated and the pupil location is known, the method includes executing instructions to follow the pupil as the eye moves.

20 Claims, 7 Drawing Sheets

INPUT DETECTION

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mounted displays" (HMDs), "head-mounted displays," "head-mounted devices," or "head-mountable devices." A head-mounted display places a graphic display or displays close to one or both eyes of a wearer. To generate the images on a display, a computer processing system may be used. Such displays may occupy a wearer's entire field of view, or only occupy part of a wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible. Active tracking of a wearer's eye position may have numerous applications for such types of wearable display uses.

SUMMARY

In one aspect, an exemplary computer-implemented method may involve: causing at least one projection of a beam of light onto an eye, receiving data regarding reflections of light off of the eye from the at least one projection, determining an edge of a pupil of the eye from the data, and, in response, (i) adjusting a subsequent projection of a beam of light onto the eye near the determined edge, (ii) receiving data regarding reflections of light off of the eye from the subsequent projection, and (iii) determining, from the data, whether the location of the edge of the pupil has changed.

In another aspect, an exemplary system may include a non-transitory computer-readable medium and program instructions stored on the non-transitory computer-readable medium. The program instructions may be executable by at least one processor to cause at least one projection of a beam of light onto an eye, receive data regarding a reflection of light from the at least one projection, determine an edge of a pupil of the eye from the data, and, in response, (i) adjust a subsequent projection of a beam of light onto the eye near the determined edge, (ii) receive data regarding reflections of light off of the eye from the subsequent projection, and (iii) determine, from the data, whether the location of the edge of the pupil has changed.

In yet another embodiment, a computer-implemented method is provided. The method comprises causing a projection of a beam of light onto an eye, receiving data regarding a reflection of light from the beam of light off of the eye, correlating a pupil of the eye with a lightest region from the data, wherein the lightest region comprises a region that is lighter relative to other regions of the reflection data and wherein the pupil is retroflexive, and executing instructions to use a perturb and observe algorithm to anticipate movement of the pupil.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Overview

An exemplary embodiment may be implemented by or take the form of a head-mountable display (HMD), or a computing system that receives data from an HMD, such as a cloud-based server system. The HMD may include an inward-facing eye-tracking system that is configured to track the movement, position, and/or orientation of the HMD wearer's eye or eyes.

To track the movement, position, and/or orientation of the HMD wearer's eye, a beam of light may be projected from the eye-tracking system onto the eye and the resulting reflection of light off of the eye may be acquired by one or more sensors. The sensors may then transmit data to the HMD regarding various degrees or shades of lightness or darkness of parts of the reflection off of the eye. A processor associated with the HMD may then analyze the data to provide an indication as to the position and orientation of the eye for a given time.

I. A Head-Mounted Display with Eye-Tracking System

Figure 1:
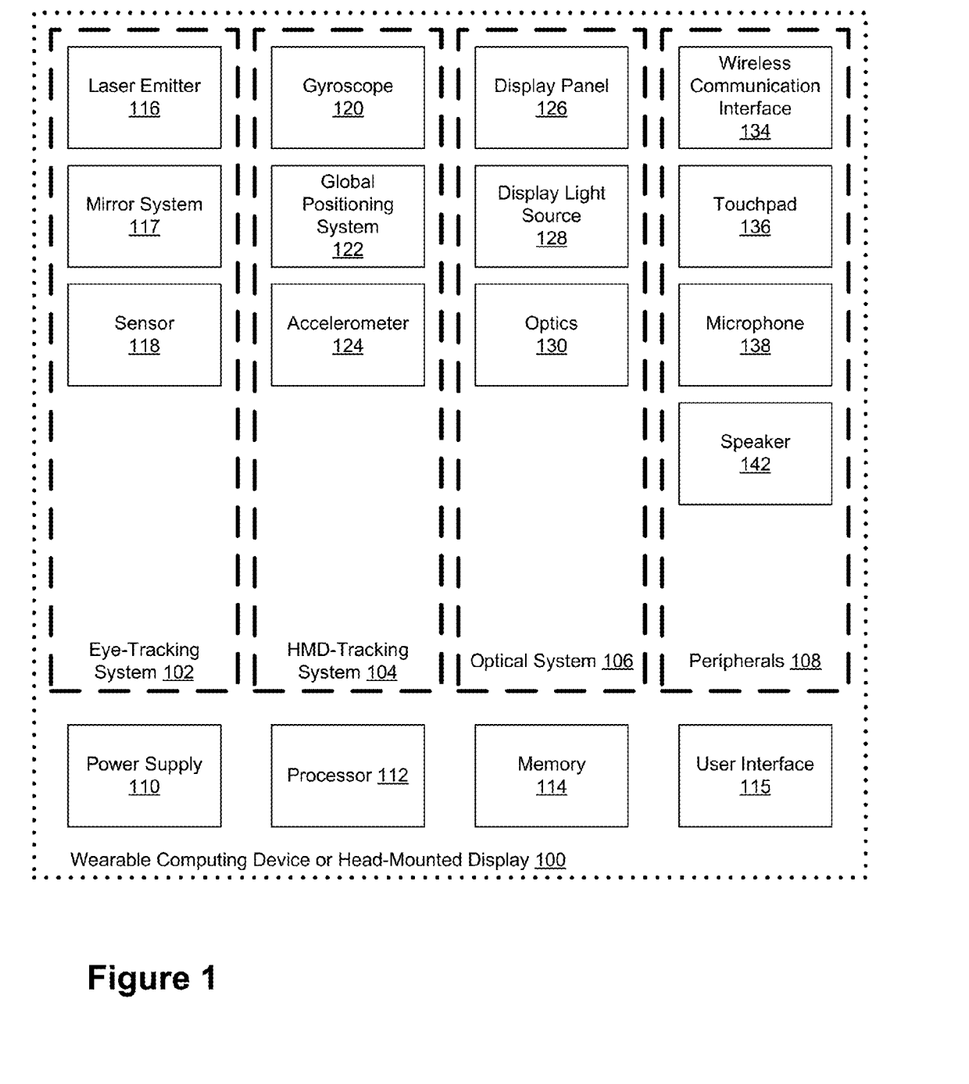
FIG. 1 is a schematic diagram of a wearable computing device, in accordance with an example embodiment.

FIG. 1 is a schematic diagram of a wearable computing device or a head-mounted display (HMD) 100, in accordance with an example embodiment. As shown, the HMD 100 includes an eye-tracking system 102, an HMD-tracking system 104, an optical system 106, peripherals 108, a power supply 110, a processor 112, a memory 114, and a user interface 115. The eye-tracking system 102 may include hardware such as a camera 116 and at least one infrared light source 118. The HMD-tracking system 104 may include a gyroscope 120, a global positioning system (GPS) 122, and an accelerometer 124. The optical system 106 may include, in one embodiment, a display panel 126, a display light source 128, and optics 130. The peripherals 108 may include a wireless communication interface 134, a touchpad 136, a microphone 138, a camera 140, and a speaker 142.

In an example embodiment, the HMD 100 includes a see-through display. Thus, the wearer of the HMD 100 may observe a portion of the real-world environment, i.e., in a particular field of view provided by the optical system 106. In the example embodiment, the HMD 100 is operable to display virtual images that are superimposed on the field of view, for example, to provide an "augmented reality" experience. Some of the virtual images displayed by the HMD 100 may be superimposed over particular objects in the field of view. The HMD 100 may also display images that appear to hover within the field of view instead of being associated with particular objects in the field of view.

Components of the HMD 100 may be configured to work in an interconnected fashion with other components within or outside their respective systems. For instance, in an example embodiment, the sensor 118 in the eye-tracking system 102 may acquire information regarding the position of one or both of the HMD wearer's eyes. The sensor 118 may deliver the information to the processor 112, which may access the memory 114 and make a determination regarding the position of the HMD wearer's eye or eyes. The processor 112 may also receive input from a camera, the GPS unit 122, the gyroscope 120, and/or the accelerometer 124 to determine HMD-to-eye relative position data. Subsequently, the processor 112 may control the user interface 115 and the display panel 126 to display virtual images to the HMD wearer that may be adjusted to compensate for displacements away from a normal viewing position.

The HMD 100 could be configured as, for example, eyeglasses, goggles, a helmet, a hat, a visor, a headband, or in some other form that can be supported on or from the wearer's head. Further, the HMD 100 may be configured to display images to both of the wearer's eyes, for example, using two see-through displays. Alternatively, the HMD 100 may include only a single see-through display and may display images to only one of the wearer's eyes, either the left eye or the right eye.

The HMD 100 may also represent an opaque display configured to display images to one or both of the wearer's eyes without a view of the real-world environment. For instance, an opaque display or displays could provide images to both of the wearer's eyes such that the wearer could experience a virtual reality version of the real world. Alternatively, the HMD wearer may experience an abstract virtual reality environment that could be substantially or completely detached from the real world. Further, the HMD 100 could provide an opaque display for a first eye of the wearer as well as provide a view of the real-world environment for a second eye of the wearer.

The power supply 110 may provide power to various HMD components and could represent, for example, a rechargeable lithium-ion battery. Various other power supply materials and types known in the art are possible.

The functioning of the HMD 100 may be controlled by the processor 112 that executes instructions stored in a non-transitory computer readable medium, such as the memory 114. Thus, the processor 112 in combination with instructions stored in the memory 114 may function as a controller of the HMD 100. As such, the processor 112 may control the user interface 115 to adjust the images displayed by the HMD 100. The processor 112 may also control the wireless communication interface 134 and various other components of the HMD 100. The processor 112 may additionally represent a plurality of computing devices that may serve to control individual components or subsystems of the HMD 100 in a distributed fashion.

In addition to instructions that may be executed by the processor 112, the memory 114 may store data that may include a set of calibrated wearer eye pupil positions and a collection of past eye pupil positions. Thus, the memory 114 may function as a database of information related to gaze direction and/or HMD wearer eye location. Such information may be used by the HMD 100 to anticipate where the wearer will look and determine what images are to be displayed to the wearer. Within the context of the invention, eye pupil positions could also be recorded relating to a 'normal' or a 'calibrated' viewing position. Eye box or other image area adjustment could occur if the eye pupil is detected to be at a location other than these viewing positions.

In addition, information may be stored in the memory 114 regarding possible control instructions that may be enacted using eye movements. For instance, specific eye movements may represent a control instruction. For example, an HMD wearer may lock or unlock the user interface 115 with a series of predetermined eye movements.

Control instructions could be based on dwell-based selection of a target object. For instance, if a wearer fixates visually upon a particular virtual image or real-world object for longer than a predetermined time period, a control instruction may be generated to select the virtual image or real-world object as a target object. Many other control instructions are possible.

The HMD 100 may include a user interface 115 for providing information to the wearer or receiving input from the wearer. The user interface 115 could be associated with, for example, the displayed virtual images and/or one or more input devices in peripherals 108, such as the touchpad 136 or the microphone 138. The processor 112 may control the functioning of the HMD 100 based on inputs received through the user interface 115. For example, the processor 112 may utilize user input from the user interface 115 to control how the HMD 100 displays images within a field of view or to determine what images the HMD 100 displays.

The eye-tracking system 102 may be included in the HMD 100 and may deliver information to the processor 112 regarding the eye position of a wearer of the HMD 100. The eye-tracking data could be used, for instance, to determine a direction in which the HMD wearer may be gazing. The processor 112 could determine target objects among the displayed images based on information from the eye-tracking system 102. The processor 112 may control the user interface 115 and the display panel 126 to adjust the target object and/or other displayed images in various ways. For instance, an HMD wearer could interact with a mobile-type menu-driven user interface using eye gaze movements.

The laser emitter 116 may be utilized by the eye-tracking system 102 to project a steerable beam of light over the eye of the wearer of the HMD 100. The mirror system 117 may serve to steer or otherwise direct the beam of light. The mirror system 117 may comprise at least one mirror that can be tilted via a micro-mechanical actuator. For instance, the mirror system 117 may be a microelectromechanical system (MEMS) actuated to tilt one or more mirrors. In another example embodiment, the mirror system 117 may be a voice coil motor (VCM) magnet that operates to tilt one or more mirrors. In another example embodiment, an actuated lens system may be used to steer the beam of light instead of a mirror system.

The laser emitter 116 is designed to project a beam of light over an object; in the present example, over an HMD wearer's eye. The eye then reflects the beam of light back toward the eye-tracking system 102, and specifically, to the sensor. In another example embodiment, instead of a laser a broader-spot light emitting diode (LED) may be used.

The sensor 118 may subsequently record the reflection of the light off of the eye. In one example embodiment, the sensor may be a single pixel, multidirectional, wide angle sensor. In another example embodiment, the sensor may be a multiple pixel linear sensor.

The eye-tracking system 102 could be configured to project a beam of light onto the eye surface, to record the reflection of the light off of the eye, and to transmit data regarding the degrees of lightness and/or darkness from the reflection to the HMD 100. The darkest point or region is assumed by the system 102 to comprise the pupil of the eye, as the pupil is represented by a dark hole that cannot reflect light back to the sensor surface. The lightest point is assumed by the system 102 to be the pupil of the eye in the instance where the pupil is retroreflexive (e.g., the red eye effect in photographs).

The eye-tracking system 102 could be used to determine the relative position of the display with respect to the HMD wearer's eye. For example, by determining where the pupil of the eye is located, the position of the eye could be sensed.

The HMD-tracking system 104 could be configured to provide an HMD position and an HMD orientation to the processor 112.

The gyroscope 120 could be a microelectromechanical system (MEMS) gyroscope, a fiber optic gyroscope, or another type of gyroscope known in the art. A MEMS gyroscope is typically significantly smaller in size than more traditional gyroscopes, and may thus allow for size reduction of the eye-tracking system 102 within which the gyroscope resides. The gyroscope 120 may be configured to provide orientation information to the processor 112. The GPS unit 122 could be a receiver that obtains clock and other signals from GPS satellites and may be configured to provide real-time location information to the processor 112. The HMD-tracking system 104 could further include an accelerometer 124 configured to provide motion input data to the processor 112. The HMD-tracking system 104 could include other sensors, such as a proximity sensor.

The optical system 106 could include components configured to provide virtual images at a viewing location. The viewing location may correspond to the location of one or both eyes of a wearer of an HMD 100. The components of the optical system 106 could include a display panel 126, a display light source 128, and optics 130. These components may be optically and/or electrically-coupled to one another and may be configured to provide viewable images at a viewing location. As mentioned above, one or two optical systems 106 could be provided in an HMD apparatus. In other words, the HMD wearer could view virtual images in one or both eyes, as provided by one or more optical systems 106. Also, as described above, the optical system(s) 106 could include an opaque display and/or a see-through display, which may allow a view of the real-world environment while providing superimposed virtual images.

Various peripheral devices 108 may be included in the HMD 100 and may serve to provide information to and from a wearer of the HMD 100. In one example, the HMD 100 may include a wireless communication interface 134 for wirelessly communicating with one or more devices directly or via a communication network. For example, wireless communication interface 134 could use 3G cellular communication, such as CDMA, EVDO, GSM/GPRS, or 4G cellular communication, such as WiMAX or LTE. Alternatively, the wireless communication interface 134 could communicate with a wireless local area network (WLAN), for example, using WiFi. In some embodiments, the wireless communication interface 134 could communicate directly with a device, for example, using an infrared link, Bluetooth, or ZigBee. The wireless communication interface 134 could interact with devices that may include, for example, components of the HMD 100 and/or externally-located devices.

Although FIG. 1 shows various components of the HMD 100 (i.e., wireless communication interface 134, processor 112, memory 114, camera 116, display panel 126, GPS 122, and user interface 115) as being integrated into the HMD 100, one or more of these components could be physically separate from HMD 100. For example, the camera 116 could be mounted on the wearer separate from the HMD 100. Thus, the HMD 100 could be part of a wearable computing device in the form of separate devices that can be worn on or carried by the wearer. The separate components that make up the wearable computing device could be communicatively coupled together in either a wired or wireless fashion.

Figure 2A:
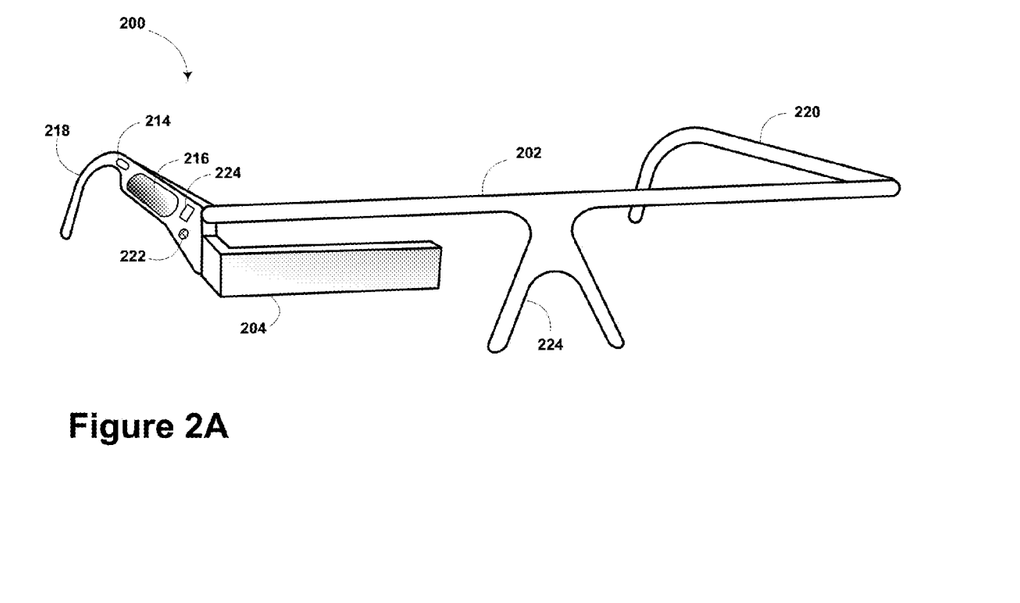
FIG. 2A is a perspective view of a head-mounted display, in accordance with an example embodiment.

FIGS. 2A, 2B, 2C, and 2D illustrate example head-mounted displays that have an eyeglasses frame format. FIG. 2A is a perspective view of a head-mounted display (HMD) 200, in accordance with an example embodiment. The HMD 200 has a frame 202 that could include a nosepiece 224 and earpieces 218 and 220. The frame 202, the nosepiece 224, and the earpieces 218 and 220 could be configured to secure the HMD 200 to a wearer's face via a wearer's nose and ears. Each of the frame elements, 202, 224, 218, and 220 may be formed of a solid structure of plastic and/or metal, or may be formed of a hollow structure of similar material so as to allow wiring and component interconnects to be internally routed through the HMD 200. Other materials may be possible as well.

The earpieces 218 and 220 could be attached to projections that extend away from the frame 202 and could be positioned behind a wearer's ears to secure the HMD 200 to the wearer. The projections could further secure the HMD 200 to the wearer by extending around a rear portion of the wearer's head. Additionally or alternatively, for example, the HMD 200 could connect to or be affixed within a head-mounted helmet structure. Other possibilities exist as well.

An optical system 204 could be attached the frame 202. The optical system 204 may be the same as or similar to the optical system 106 described with reference to FIG. 1. The optical system 204 could be formed of any material that can suitably display a projected image or graphic. At least a portion of the optical system 204 could be sufficiently transparent to allow a wearer to see through a lens element. The optical system 204 may thus facilitate an augmented reality or a heads-up display where the projected image or graphic is superimposed over a real-world view as perceived by the wearer through optical system 204.

The HMD 200 may include a computer 214, a touch pad 216, a microphone 222, a button 224, and the optical system 204. The computer 214 is shown to be positioned on the extending side arm of the HMD 200; however, the computer 214 may be provided on other parts of the HMD 200 or may be positioned remote from the HMD 200 (e.g., the computer 214 could be wire- or wirelessly-connected to the HMD 200). The computer 214 could include a processor and memory, for example. The computer 214 may be configured to receive and analyze data from sensory devices, user-interfaces, or both, and generate images for output by the optical system 204.

Although not shown in FIG. 2A, 2B, 2C, or 2D, additional sensors could be incorporated into the HMD 200. Such sensors may include one or more of a gyroscope, an accelerometer, and/or a proximity sensor, for example. Other sensing devices may be included in the HMD 200.

The touch pad 216 is shown on an extending side arm of the HMD 200. However, the touch pad 216 may be positioned on other parts of the HMD 200. Also, more than one touch pad may be present on the HMD 200. The touch pad 216 may be used by a HMD wearer to input commands. The touch pad 216 may sense at least one of a position and a movement of a finger via capacitive sensing, resistance sensing, or a surface acoustic wave process, among other possibilities. The touch pad 216 may be capable of sensing finger movement in a direction parallel or planar to the pad surface, in a direction normal to the pad surface, or both, and may also be capable of sensing a level of pressure applied to the pad surface. The touch pad 216 may be formed of one or more translucent or transparent insulating layers and one or more translucent or transparent conducting layers. Edges of the touch pad 216 may be formed to have a raised, indented, or roughened surface, so as to provide tactile feedback to an HMD wearer when the wearer's finger reaches the edge, or other area, of the touch pad 216. If more than one touch pad is present, each touch pad may be operated independently, and may provide a different function.

The optical system 204 could represent, for instance, an at least partially reflective surface upon which images could be projected using a projector (not shown). For instance, the optical system 204 could act as a combiner in a light projection system and may include a coating that reflects the light projected onto them from projectors. In some embodiments, a reflective coating may be omitted (e.g., when the projectors are scanning laser devices). The projected images could be thus viewable to an HMD wearer.

Although the optical system 204 is depicted as presented to the right eye of the HMD wearer, it will be understood that other example embodiments could include an optical system for the HMD wearer's left eye, dual optical system for both eyes, or a single optical system viewable by both eyes. Additionally, the optical system 204 may be integrated into lenses (e.g., glasses lenses) located in front of one or both eyes of the HMD wearer.

In alternative embodiments, other types of display elements may be used in the optical system 204. For example, the optical system 204 may include: a transparent or semi-transparent matrix display, such as an electroluminescent display or a liquid crystal display, one or more waveguides for delivering an image to the HMD wearer's eyes, or other optical elements capable of delivering an in-focus near-to-eye image to the wearer. A corresponding display driver may be disposed within the frame 202 for driving such a matrix display. Alternatively or additionally, a laser or light-emitting diode (LED) source and scanning system could be used to draw a raster display directly onto the retina of one or more of the wearer's eyes. Other possibilities exist as well.

Figure 2B:
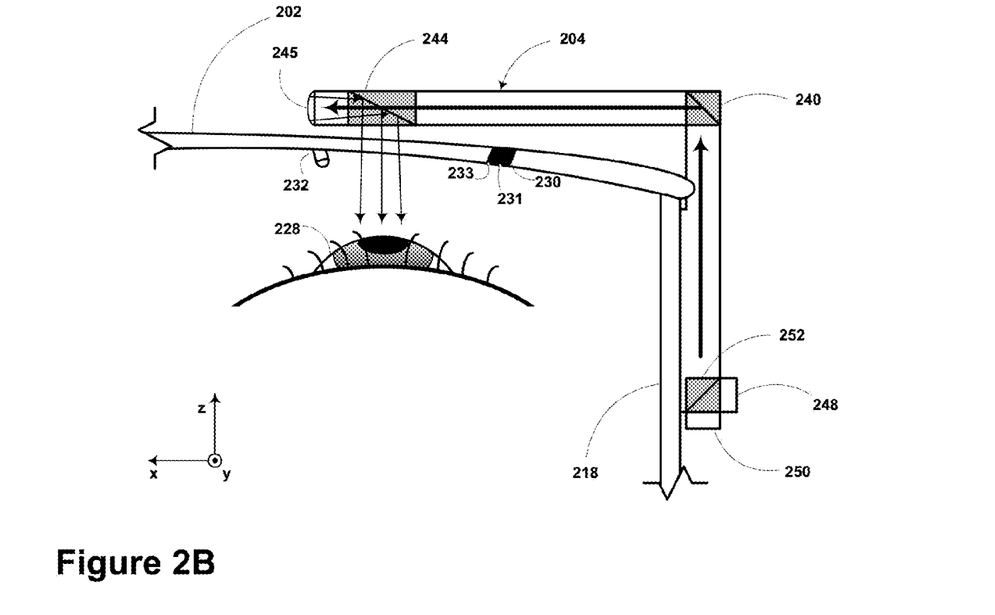
FIG. 2B is a top view of the head-mounted display in FIG. 2A, in accordance with an example embodiment.

FIG. 2B is a top view of the HMD 200 illustrated in FIG. 2A and described above. In an example embodiment, the optical system 204 could be attached onto or integrated into HMD 200. Additionally, the HMD 200 may include one or more eye-tracking systems such as an eye-tracking system 230, which may be configured to track the eye position of one or both eyes of the HMD wearer.

The eye-tracking system 230 may include a housing 232 containing a first hole 231 though which a laser emitter within the housing projects a beam of light. The housing 232 may also contain a second hole 233 allowing for one or more sensors to receive information from the environment outside of the housing therethrough. The components of an example eye-tracking system 230 will be described in further detail in FIG. 3. The eye-tracking system 230 could be configured to project a laser, through the first hole 231, onto one or both of the HMD wearer's eyes.

The optical system 204 could include a display light source 248, a display panel 250, a display beam splitter 252, a proximal beam splitter 244, and an image former 245. In one embodiment, the optical element could include a distal beam splitter 240. Further, although one optical system 242 is shown in FIGS. 2A, 2B, 2C, and 2D, in some embodiments, optical systems 204 could be provided to both eyes of an HMD wearer. Those with skill in the art will understand there are many other configurations possible in such an optical system and those configurations are implicitly contemplated herein.

The display panel 250 could be configured to generate a light pattern from which virtual and/or real images could be formed. The display panel 250 could be an emissive display, such as an organic light-emitting diode (OLED) display. Alternatively, the display panel 250 may be a liquid-crystal on silicon (LCOS) or a micro-mirror display such as a digital light projector (DLP) that generates the light pattern by spatially modulating light from the display light source 248. The display light source 248 may include, for example, one or more light-emitting diodes (LEDs) and/or laser diodes. The light pattern generated by the display panel 250 could be monochromatic, or it could include multiple colors (such as red, green, and blue) to provide a color gamut for the virtual and/or real images.

In an example embodiment, the distal beam splitter 240 could substantially reflect light from the display panel 250 towards the proximal beam splitter 244 and the image former 245. The image former 245 may include a concave mirror or other optical component that forms a virtual image that is viewable through the proximal beam splitter 244. In this manner, a viewable image could be delivered to the HMD wearer's eye 228.

Figure 2C:
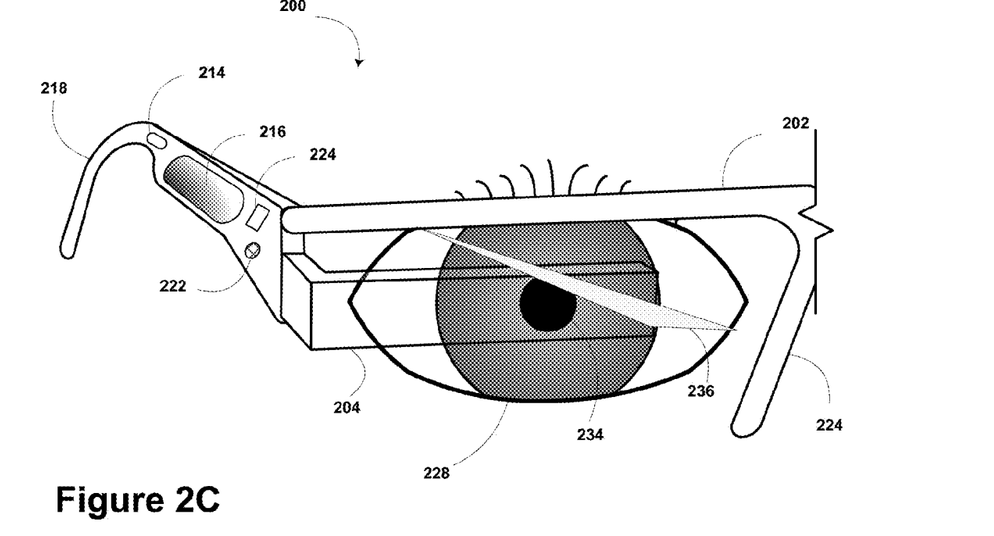
FIG. 2C is a perspective view of a head-mounted display, in accordance with an example embodiment.

FIG. 2C is a perspective view of the HMD 200 that provides a close-up view of optical system 204 and the right eye 228 of the HMD wearer. As shown in FIG. 2C, a beam of light 236 is projected from the eye-tracking system 230 through the first hole 231 of the eye-tracking system 230. The beam of light 236 may be projected onto one or both eyes of an HMD wearer; in the present example, the beam of light 236 is projected onto the eye 228. The position of the beam of light 236 may be based on the relative position of the HMD 200 with respect to the HMD wearer's eye 228, and may be directed or steered using a mirror system (shown in FIG. 3) within the eye-tracking system 230.

In an example embodiment, the eye-tracking system 230 may serve to track the HMD wearer's eye 228. First, a laser emitter within the eye-tracking system 230 projects the beam of light 236 onto the eye 228. In one example embodiment, the beam of light 236 may be projected in a raster scan pattern across the eye 228. A sensor, through the second hole 233, acquires data regarding light reflected (or not reflected) off of the eye 228 from the emitted beam of light 236. The sensor may then transmit the reflection data to the HMD 200. A processor associated with the HMD 200 may then determine, from the reflection data, the position of the pupil 234 in the eye 228.

In another example embodiment, a moving, narrow beam sensor and a fixed illumination source may be used instead of moving a beam of light from an illumination source.

The laser emitter may thereafter project the beam of light 236 across a much smaller region of the eye 228 than what was projected for the initial raster scan to continue to track the position of the pupil 234 as the pupil 234 moves without having to perform subsequent full raster scans of the eye 228. To do so, the eye-tracking system 230 and the HMD 200 may incorporate a method such as perturb and observe and/or an algorithm in conjunction with the initial position information.

For example, in an example embodiment using a perturb and observe method to track the eye 228, after the initial pupil location is determined, the eye-tracking system 230 may project the beam of light 236 over a small region of the eye, in a direction moving away from the initial pupil location. With each small movement of the beam of light 236, the eye-tracking system 230 transmits reflection data generated from the beam of light 236 to the HMD 200, until an edge of the pupil 234 is determined from the data. The edge may be determined from reflection data indicating a change in the data between two locations; for example, from a location where light is reflected to a location where light was not reflected. After the edge of the pupil is determined, the beam of light 236 may be instructed to scan back and forth over the eye over a length comprising the estimated or anticipated width of the pupil, which is a smaller scan than a typical raster scan of the eye. The reflection data transmitted to the HMD 200 from such scans may be plotted on a graph to determine a local maxima indicating the location of the pupil at that moment in time. An example eye-tracking graph indicating a local maxima will be described in further detail in FIG. 4.

Furthermore, after the pupil 234 location has been determined by the HMD 200, the eye-tracking system 230 may be re-centered and may set as a center for scanning purposes the last determined location of the pupil 234.

A controller could use the determined pupil and/or eye position as an input to control software and/or hardware so as to keep the displayed images centered on the HMD wearer's eye 228.

Figure 2D:
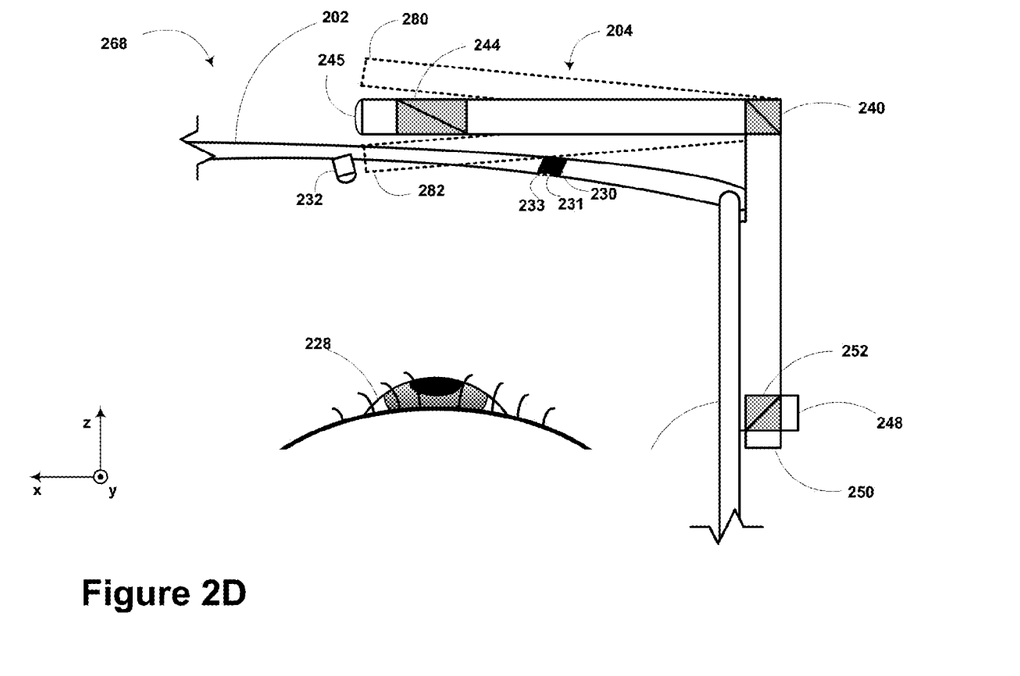
FIG. 2D is a top view of the head-mounted display in FIG. 2C, in accordance with an example embodiment.

FIG. 2D is a top view of the HMD 200. A depicted scenario 268 illustrates how HMD movement relative to a viewing position could cause a keystoning effect. In one embodiment, an optical system 204 could be integrated or attached to a frame 202. Due to HMD wearer movement, adjustment of the optical system 204, and other displacements, the HMD optical system could be presented to the HMD wearer throughout a range of depths and angles (e.g., optical system locations 280 and 282).

The display area could include a display area pixel set that could be a superset of the image area and corresponding image area pixel set. By subsetting the image area pixel set within the display area pixel set, vector graphics could be foreshortened or otherwise adjusted due to keystone effects. In some instances, the image area pixel set could be the same as the display area pixel set, for instance, if the HMD is not moving with respect to the HMD wearer. Depending upon the amount of relative movement detected between the HMD and the HMD wearer, the image area pixel set could be subset within the display area pixel set to a greater or lesser degree.

In some examples, knowledge of the eye anatomy and dynamics may be combined with the data received from reflected light off of the eye to determine the direction of the eye's gaze. More specifically, the eye movement in the upward and downward directions, as well as the eye's side to side rotation is controlled by four major muscles, in addition to other minor muscles for rotating around the visual axis. The muscles apply force, making eye motion predictable using a Kalman filter. Additionally, knowledge regarding eye saccades allows for the prediction of where the eye is relative to a previous frame at a point in time. Furthermore, noisy observations may be combined with knowledge of eye dynamics to come up with a more a more optimal estimate of where the pupil of the eye is pointing.

Using eye-tracking, the relative position of the HMD wearer's eye to the HMD may be monitored. Thus, when relative movement occurs, the HMD may control the optical system to move the images in an effort to maintain them within the HMD user's view. The image movement could include scaling of some or all of the displayed images. Such scaling may include shrinking (or subsetting) the area of the displayed images. Further, the entire scaled set of displayed images could be moved based on the relative movement of the HMD wearer's eye.

Feedback from the eye-tracking system may control the HMD to continue moving the images in a same direction, to move images in a different direction, or to select an item displayed.

Figure 3:
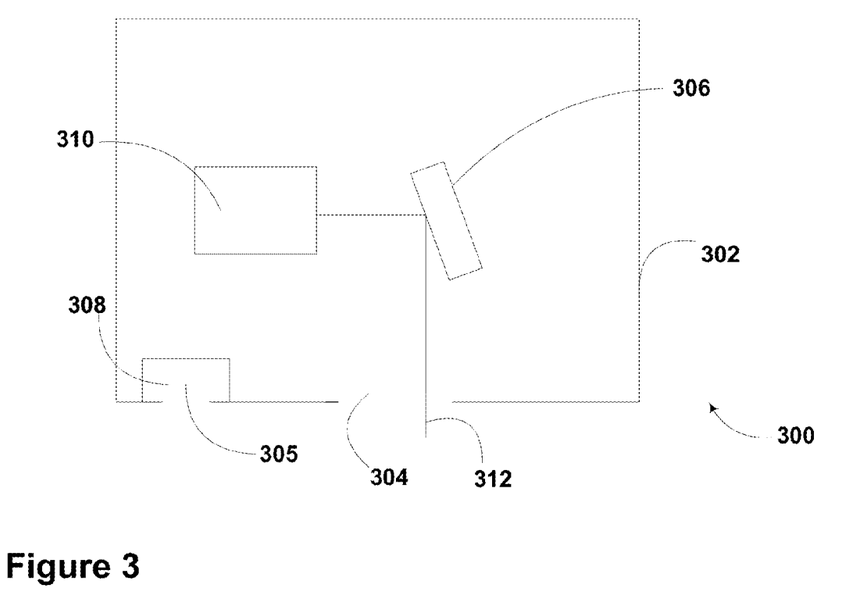
FIG. 3 is a schematic of an eye-tracking system, in accordance with an example embodiment.

FIG. 3 illustrates a schematic of an example eye-tracking device 300 that may be implemented on an HMD, such as the eye-tracking device 230 on the HMD 200 of FIGS. 2A-D. In FIG. 3, the eye-tracking device 300 comprises a housing 302 with a first hole 304 and a second hole 305. Within the housing 302 is a laser emitter 310, a mirror 306, and a sensor 308.

The housing 302 may be integral with the framework of the HMD, and the sides of the housing 302 may be flush with the sides of the framework of the HMD so as to provide a seamless transition from the housing to the framework.

The first hole 304 may be sized so as to be large enough to allow for a beam of light 312 to pass through at various angles. The second hole 305 may be sized to allow for the sensor 308 to acquire data regarding any reflection off of one or both eyes of the wearer of the HMD 300.

The laser emitter 310 is configured to project the beam of light 312 onto the mirror 306. The beam of light may be infrared.

The mirror 306 may a MEMS actuated mirror, as described with reference to FIG. 1, and may be pivotable or tiltable to direct the beam of light 312 in a desired direction. In another example embodiment, more than one mirror may be present, and the beam of light 312 may bounce from mirror to mirror to be steered in a desired direction. In one example embodiment, a wearer of the HMD may be able to manipulate the direction of the mirror 306 and thus to control the direction of the beam of light. In another example embodiment, the HMD may be configured to automatically manipulate the direction of the mirror 306 so as to provide a methodical and thorough scan (such as a raster scan, for example) of the HMD wearer's eye. In this example embodiment, the HMD may be programmed to initially scan the entire eye surface, and after the location of the eye pupil has been determined, to responsively adjust the scan so as to only scan a region of the eye near the last-known location of the eye pupil. Other variables may also be taken into account by the HMD to determine the direction, breadth, and number of scans of the beam of light 312 to perform. Alternatively, the HMD may be programmed to simply perform a full eye scan with the beam of light 312 every time.

The mirror 306 is designed to direct the beam of light 312 through the first hole 304 at a desired angle.

The sensor 308 may be positioned adjacent the second hole 305 such that the sensor 308 may acquire information from the environment outside of the housing 302. The sensor 308 may be a single, multidirectional sensor. The sensor 308 and the second hole 305 may be positioned at a different location than that depicted in FIG. 3, for example on the opposite side of the first hole 304. In an alternative embodiment, the second hole 305 may not be present and the sensor 308 may be positioned within the housing 302 behind the first hole 304. In this alternative embodiment, the first hole 304 may be sized to be large enough to accommodate both the projection of the beam of light 312 as well as the sensor 308. The sensor 308 may monitor reflections of the beam of light 312 off of an object (such as an eye of an HMD wearer). The sensor 308 may be configured to store and transmit data regarding the monitored reflections of the beam of light 312 to the HMD.

As shown in FIG. 3, the eye-tracking system 300 is comprised of a minimal number of components and thus provides for ease of manufacture, as well as a compact configuration.

Figure 4:
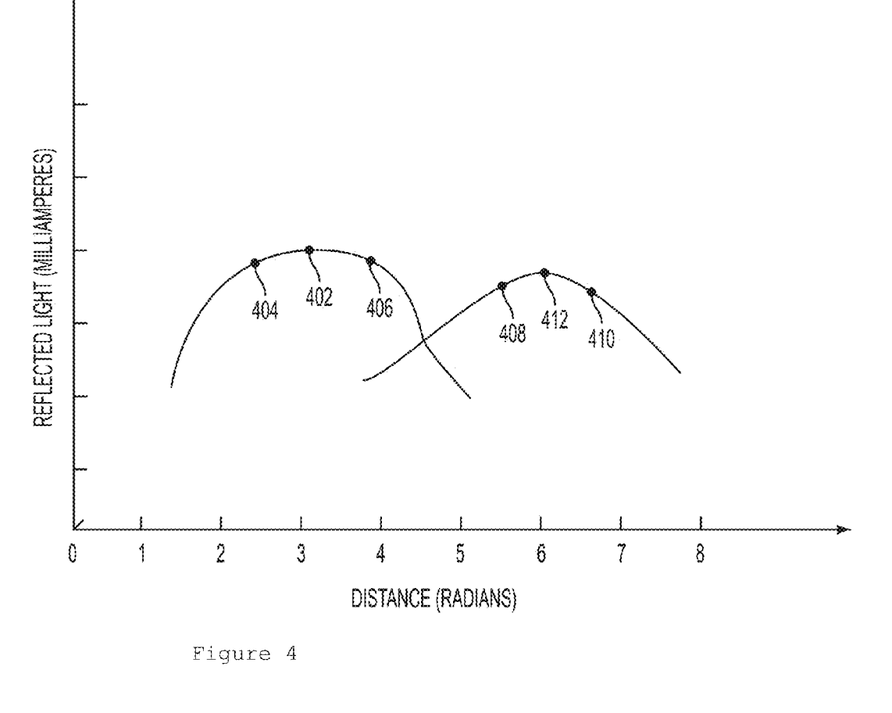
FIG. 4 is a graph of reflection data obtained from an eye-tracking system, in accordance with an example embodiment.

FIG. 4 is a graph 400 of reflection data obtained from an eye-tracking system, in accordance with an example embodiment. The graph 400 plots reflected light, in milliamperes (current through a photodiode), over distance, in radians. The distance may be taken from a "center" that is calibrated by the HMD 200 once the HMD 200 is in place on a wearer. In FIG. 4, the "center" is determined to be point zero, and may represent a location on a wearer's face, on or near the wearer's eye. Reflected light (e.g., light reflected off of an eye from a beam of light as described with reference to FIGS. 2A-D) will begin to decrease near the location of the pupil and when the light hits the pupil, the light will not be reflected. The graph 400 demonstrates this phenomenon, with point 402 being the edge of the pupil and points 404, 406 being locations on either side of the edge of the pupil.

In practice, a first raster scan of an eye may be performed, and reflection data from that scan may be sent to an eye-tracking system, such as eye-tracking system 230 as described with reference to FIGS. 2A-D. Thereafter, the location of an edge of the pupil may be determined. The edge of the pupil may be found by determining, from the reflection data, the point of change from reflection to non-reflection. The edge may be found using data from the initial raster scan, in one example embodiment. In another example embodiment, smaller scans may be performed near the determined pupil location, until the reflection data provides an indication of an edge of the pupil. Points 404, 406 may be plotted from reflection data and are assumed maxima, as the slope is near zero between the points. The edge of the pupil may be determined to be a local maxima that lies between the assumed maxima points 404, 406, shown in graph 400 as point 402.

After determining a local maxima, such as point 402 in the example shown in FIG. 4, subsequent short scans on the eye that oscillate between the locations on the eye represented by the two assumed maxima point 406, 408 may be performed by the eye-tracking system 230. If the pupil of the eye moves, the scans will produce reflection data indicating new maxima at different locations, for example maxima points 408 and 410, on graph 400, and a new local maxima 412 will be determined from maxima points 408 and 410.

Tracking a pupil using short light beam scans in combination with a method that provides for a local maxima determination, such as described in the example graph 400, minimizes power consumption by avoiding raster-scanning the light beam with every scan.

II. Eye-Tracking Methods Based on Laser Beam Reflections

Figure 5:
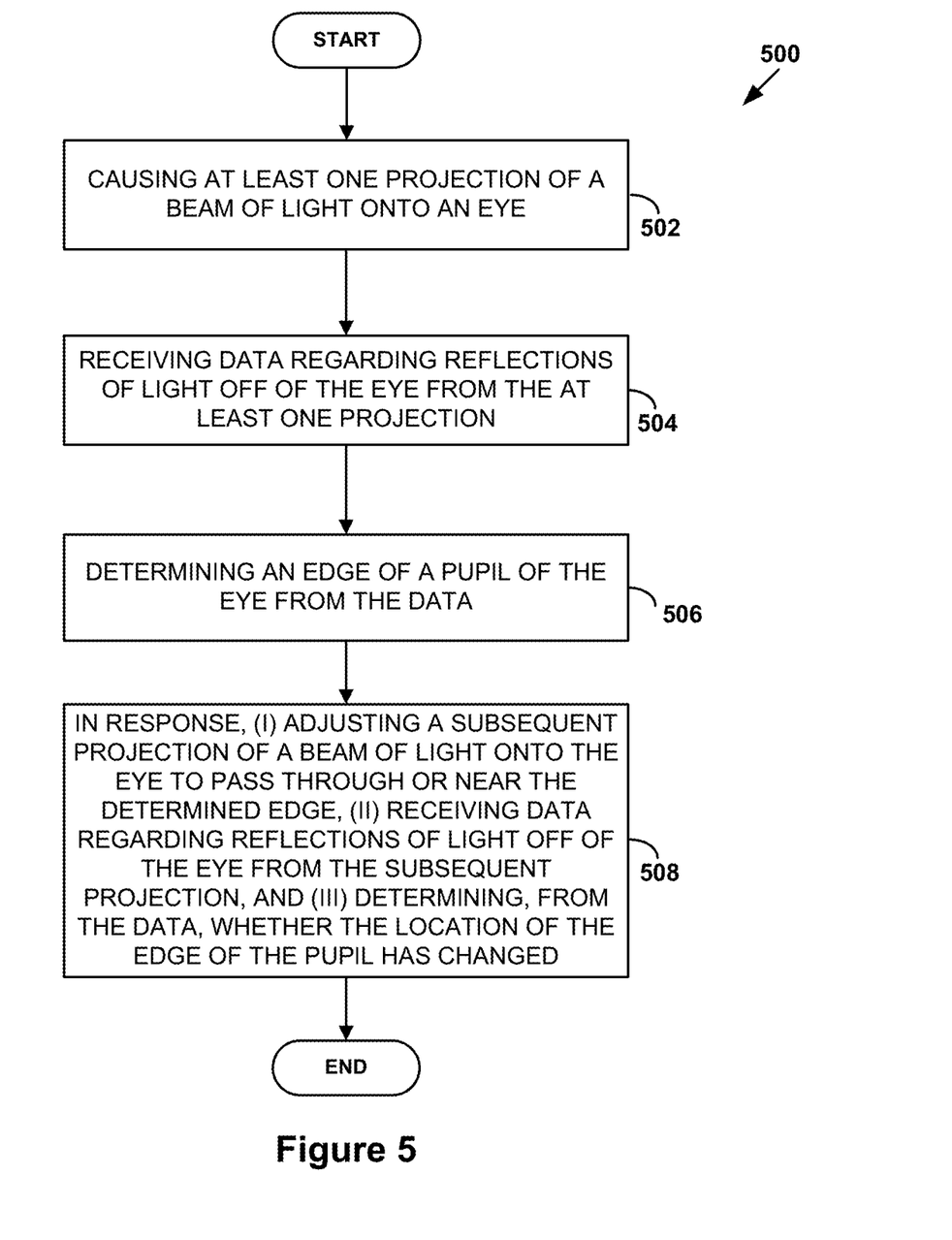
FIG. 5 is a flow chart illustrating a method for eye-tracking, in accordance with an example embodiment.

FIG. 5 is a flow chart illustrating a method for eye-tracking, in accordance with an example embodiment. Method 500 may be carried out in whole or in part by a wearable computer having a head-mountable display, but may be carried out by other devices or systems as well. Method 500 may be implemented to track a user's eye movements on a wearable computer such as an HMD.

Accordingly, exemplary methods may be described by way of example herein as being implemented by an HMD. However, it should be understood that an exemplary method may be implemented in whole or in part by other types of computing devices. For example, an exemplary method may be implemented in whole or in part by a server system, which receives data from a device such as an HMD. As further examples, an exemplary method may be implemented in whole or in part by a mobile phone, tablet computer, or laptop computer equipped with a camera, by a network-enabled camera, and/or by other computing devices configured to capture and/or receive eye-image data. Other examples of computing devices or combinations of computing devices that can implement an exemplary method are possible.

As shown by block 502, the exemplary method 500 involves causing at least one projection of a beam of light onto an eye. The projection may be emitted from a laser emitter, such as the laser emitter 310 described with reference to FIG. 3. One or more mirrors may be used to direct the beam of light onto the eye, as described with reference to FIG. 3.

The method 500 then comprises receiving data regarding reflections of light from off of the eye from the at least one projection, as shown by block 504. The reflections may be acquired up by a sensor, such as the sensors 118 and 308 of FIGS. 1 and 3, for example.

At block 506, the method includes determining an edge of a pupil of the eye from the data. The sensor may pick up various degrees of lightness and/or darkness in the reflection of the beam of light off of the eye. The pupil of an eye generally does not reflect light; thus the portion of the reflection from the laser beam being directed over the pupil may show up as a region that is darker when compared with the portion of the reflection from the laser beam being directed over the iris or the sclera of the eye, for example. The edge may be correlated with the transition from a location of non-reflection of light to a location of reflection of light.

In response to correlating the darkest region with the pupil of the eye, the method 500 includes in response, (i) adjusting a subsequent projection of a beam of light onto the eye near the determined edge, (ii) receiving data regarding reflections of light off of the eye from the subsequent projection, and (iii) determining, from the data, whether the location of the edge of the pupil has changed, as shown by block 508. The subsequent projections of beams of light may span significantly smaller distances across the eye than the initial projection, as the subsequent projections focus on a particular location (the edge of the eye). A perturb and observe method may be used to anticipate movement of the pupil of the eye, as described with reference to FIG. 4. Additionally, the processor on the wearable computing system may execute instructions to cause the display to move in correlation with the eye position, or to cause for the selection of an item on the display.

Figure 6:
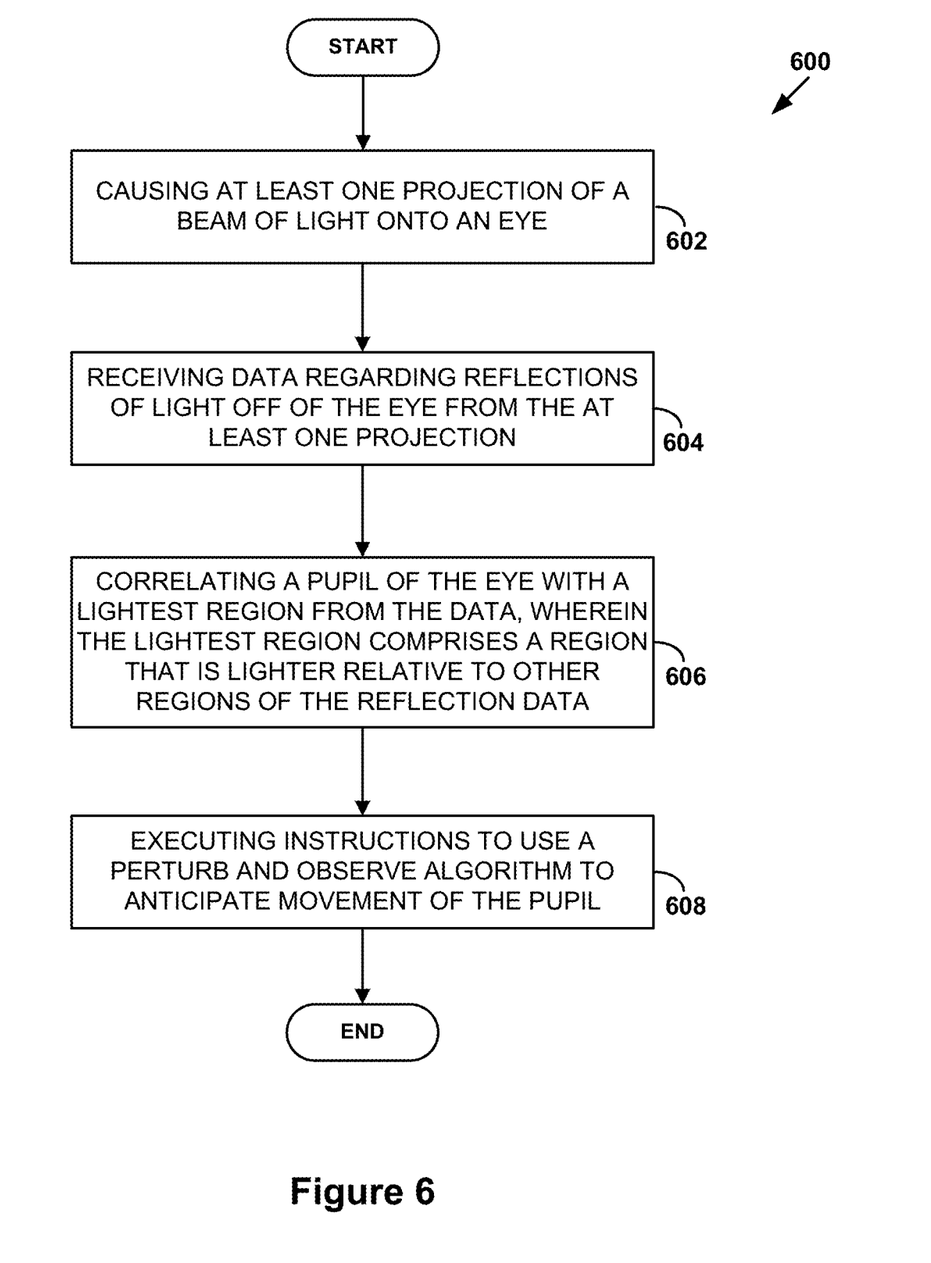
FIG. 6 is a flow chart illustrating a method for eye-tracking, in accordance with an example embodiment.

FIG. 6 is another flow chart illustrating a method for eye-tracking, in accordance with an example embodiment. Method 600 is described by way of example as being carried out by a wearable computer, but may be carried out by other devices or systems as well.

As shown by block 602, the exemplary method 600 involves causing a projection of a beam of light onto an eye. The projection may be emitted from a laser emitter, such as the laser emitter 310 described with reference to FIG. 3. One or more mirrors may be used to direct the beam of light onto the eye, as described with reference to FIG. 3.

The method 600 then comprises receiving data regarding a reflection of light from the beam of light off of the eye, as shown by block 504. The reflection of the beam of light may be acquired up by a sensor, such as the sensors 118 and 308 of FIGS. 1 and 3, for example.

At block 606, the method includes correlating a pupil of the eye with a lightest region from the reflection data, wherein the lightest region comprises a region that is lighter relative to other portions of the reflection data on the eye. The sensor may pick up various degrees of lightness and/or darkness in the reflection of the beam of light off of the eye. The pupil may be retroflexive (e.g., a "red eye" phenomenon), and would thus show up in a reflection as lighter than the other parts of the eye. In this example, light can reflect off of the retina, causing it to be the lightest region. The retina will retroreflect the laser directly back at the sensor.

In response to correlating the lightest region with the pupil of the eye, the method 600 includes executing instructions to use a perturb and observe algorithm to anticipate movement of the pupil, as shown by block 608. A processor on the wearable computing system may thereafter execute instructions to cause the display to move in correlation with the eye position, or to cause for the selection of an item on the display.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
causing at least one projection of a beam of light to span a distance across an eye;
receiving data regarding reflections of light off of the eye from the at least one projection;
determining an edge of a pupil of the eye from the data; and
in response, (i) adjusting a subsequent projection of a beam of light onto the eye to span a shorter distance across the eye than the at least one projection and to pass through or near the determined edge, (ii) receiving data regarding reflections of light off of the eye from the subsequent projection, and (iii) determining, from the data, whether the location of the edge of the pupil has changed.

2. The method of claim 1, wherein determining the edge of the pupil of the eye from the data comprises correlating, from the data, a transition from a location of non-reflection of light to a location of reflection of light with the edge of the pupil.

3. The method of claim 2, wherein determining from the data whether the location of the edge of the pupil has changed comprises determining a local maxima from the reflection data, wherein the local maxima correlates to the edge of the pupil.

4. The method of claim 1, wherein a local maxima represents a darkest point from the data, wherein the darkest point comprises a location that is darker relative to other portions of the data on the eye.

5. The method of claim 1, wherein the method is implemented on a wearable computing device.

6. The method of claim 1, further comprising:
steering the beam of light using at least one mirror.

7. The method of claim 6, wherein steering the beam of light using at least one mirror comprises executing instructions to position the at least one mirror relative to a laser emitter that emits the beam of light so as to bounce the beam of light off of the mirror to a desired target.

8. The method of claim 7, wherein the desired target is a region on the eye.

9. The method of claim 1, wherein receiving data regarding the reflection of light comprises receiving the data from a single pixel, wide angle sensor.

10. The method of claim 1, further comprising:
executing instructions to cause an item on a display to move in correlation with the location of the edge of the pupil.

11. A system comprising:
a non-transitory computer-readable medium; and
program instructions stored on the non-transitory computer-readable medium and executable by at least one processor to:
cause at least one projection of a beam of light to span a distance across an eye;
receive data regarding reflections of light off of the eye from the at least one projection;
determine an edge of a pupil of the eye from the data; and
in response, (i) adjust a subsequent projection of a beam of light onto the eye to span a shorter distance across the eye than the at least one projection and to pass through or near the determined edge, (ii) receive data regarding reflections of light off of the eye from the subsequent projection, and (iii) determine, from the data, whether the location of the edge of the pupil has changed.

12. The system of claim 11, wherein the non-transitory computer-readable medium is present on a wearable computing device.

13. The system of claim 12, wherein the system is a wearable computer and the display is a head-mounted display.

14. The system of claim 11, wherein the instructions are further executable to:
steer the beam of light using at least one mirror.

15. The system of claim 14, wherein the instructions to steer the beam of light using at least one mirror comprise causing the positioning of the at least one mirror relative to a laser emitter that emits the beam of light so as to bounce the beam of light off of the mirror to a desired target.

16. The system of claim 14, wherein the at least one mirror comprises a MEMS-actuated mirror.

17. The system of claim 11, wherein the instructions to cause the projection of at least one beam of light onto an eye comprises instructions to cause a laser emitter to project the at least one beam of light.

18. The system of claim 17, wherein the system further provides a position and an orientation of the edge of the pupil to the processor.

19. The system of claim 11, wherein the instructions to receive data regarding the reflection of light comprise instructions to receive the data from at least one sensor.

20. A computer-implemented method comprising:
causing a projection of a beam of light to span a distance across an eye;

receiving data regarding reflections of light off of the eye from the at least one projection;

determining an edge of a pupil of the eye from the data, wherein the pupil is retroflexive and comprises a lightest region from the data; and in response, (i) adjusting a subsequent projection of a beam of light onto the eye to span a shorter distance across the eye than the at least one projection and to pass through or near the determined edge, (ii) receiving data regarding reflections of light off of the eye from the subsequent projection, and (iii) determining, from the data, whether the location of the edge of the pupil has changed.

* * * * *